United States Patent [19]
Kuisma

[11] Patent Number: 4,862,317
[45] Date of Patent: Aug. 29, 1989

[54] CAPACITIVE PRESSURE TRANSDUCER
[75] Inventor: Heikki Kuisma, Helsinki, Finland
[73] Assignee: Vaisala Oy, Helsinki, Finland
[21] Appl. No.: 190,112
[22] Filed: May 4, 1988
[30] Foreign Application Priority Data
  May 8, 1987 [FI] Finland ................. 872050
[51] Int. Cl.⁴ .................. H01G 5/16; G01L 9/12
[52] U.S. Cl. ......................... 361/283; 73/718
[58] Field of Search ............. 73/718, 724; 361/283
[56] References Cited
  U.S. PATENT DOCUMENTS
  2,808,545 10/1957 Hirtreiter et al. ............ 361/283
  3,397,278  8/1968 Pomerantz .
  4,257,274  3/1981 Shimada et al. ............... 73/718
  4,301,492 11/1981 Paquin et al. ............... 361/283
  4,542,435  9/1985 Freud et al. .
  4,589,054  5/1986 Kuisma .
  4,597,027  6/1986 Lehto .
  4,599,906  7/1986 Freud et al. .
  4,609,966  9/1986 Kuisma .
  4,628,403  9/1986 Kuisma .
  4,691,575  9/1987 Sonderegger et al. ....... 73/724 X
  4,769,738  9/1988 Nakamura et al. ............ 361/283

Primary Examiner—Donald A. Griffin
Attorney, Agent, or Firm—Birch, Stewart, Kolasch & Birch

[57] ABSTRACT

A capacitive pressure transducer includes a capacitive sensor structure, a case into which the capacitive sensor structure is adapted, channels formed in the case for introducing a measured medium into the capacitive sensor structure, and electrical conductors to make the pressure-related capacitive sensor information externally available. According to the invention, the capacitive sensor structure is fixed to the case by means of elastic structures, which elastic structures provide a floating support for the capacitive sensor structure adapted between the elastic structures. The construction in accordance with the invention cancels errors caused by temperature variations.

5 Claims, 2 Drawing Sheets

1

CAPACITIVE PRESSURE TRANSDUCER

BACKGROUND OF THE INVENTION

1. Field of the Invention

The present invention relates to a capacitive pressure transducer.

2. Description of Related Art

References to the prior art include the following patent publications:

[1] U.S. Pat. No. 4,589,054 (Kuisma)
[2] U.S. Pat. No. 4,597,027 (Lehto)
[3] U.S. Pat. No. 3,397,278 (Pomerantz)
[4] U.S. Pat. No. 4,609,966 (Kuisma)
[5] U.S. Pat. No. 4,599,906 (Freud et al.)
[6] U.S. Pat. No. 4,542,435 (Freud et al.)
[7] U.S. Pat. No. 4,257,274 (Shimada et al.)
[8] U.S. Pat. No. 4,628,403 (Kuisma)

A disadvantage of capacitive pressure transducer constructions found in prior art technology is that they are difficult to implement in mass production. Further, elimination of temperature-dependent errors to a reasonable level has previously been unsuccessful.

The aim of the present invention is to overcome the disadvantages of the prior art technology and achieve a totally new kind of capacitive pressure transducer.

SUMMARY OF THE INVENTION

The invention is based on mounting the capacitive sensor element into the transducer case between the two sheet metal halves of the case by means of resilient insulating layers fabricated from an elastomer so that the capacitive sensor is floating between the resilient layers insulating while being fixed with respect to the capacitive pressure transducer as a whole.

The construction in accordance with the invention provides outstanding benefits, including:

1. improved adaptability to mass production and better bondability compared to differential capacitors fabricated from similar materials See prior art references [6] and [7] in particular, 2. isolation of error sources related to the difference of thermal expansion coefficients between the capacitive sensor and the metallic case as well as the deformation of metallic parts under prior art measurement pressure. For comparison we can take, e.g., the reference [6] which describes a complicated construction aiming to achieve equal benefits.

3. as known from prior art reference [8], the advantageous dependence of pressure sensitivity in a capacitor results in a higher sensitivity at low pressures compared with the sensitivity at higher pressures. This property can also be utilized in conjunction with a differential pressure sensor, whereby the pressure $P_1$ in channel 22 must be greater than the pressure $P_2$ in channel 23. Compared to symmetrical constructions of differential capacitors shown in prior art references [6], [7], we now attain a wider usable measurement span with a single sensor element.

By virtue of its high elasticity, the elastomer does not transmit to the sensor capacitor the mechanical stress caused by the deformation of the metal case or by the differential thermal expansion related to the different expansion coefficients of the sensor capacitor material and the case metal. The location of the sensor capacitor between the two supporting surfaces is fixed so that the imposed pressure difference to be measured cannot stretch the elastomer layer excessively in the direction perpendicular to its plane. The shear strength of the elastomer is increased to a sufficient level by using a thin layer together with a large area. It must be noted that the construction in accordance with the present invention not only offers compensation for the temperature dependence on the dielectric properties of the insulating material but also cancels other causes of temperature-dependent errors, such as those caused by elastic stress properties and thermal expansion characteristics, as well as the thermal expansion of the silicon oil pressure medium if the isolation diaphragms are located close to the sensor element and in effective thermal contact with it.

The invention is next examined in detail with help of the following exemplifying embodiment illustrated in the attached figures.

DETAILED DESCRIPTION OF PREFERRED EMBODIMENTS

Figure 1:
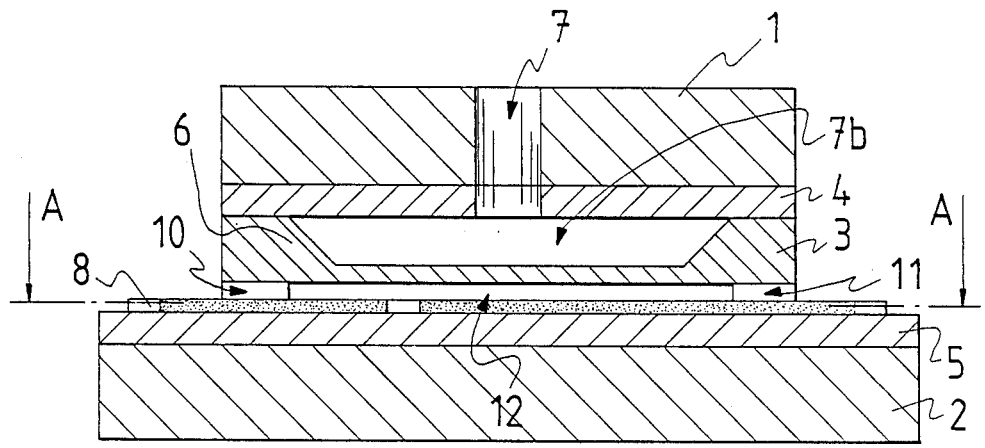
FIG. 1 is a cross-sectional side view of a capacitive sensor construction in accordance with the invention.
Figure 2:
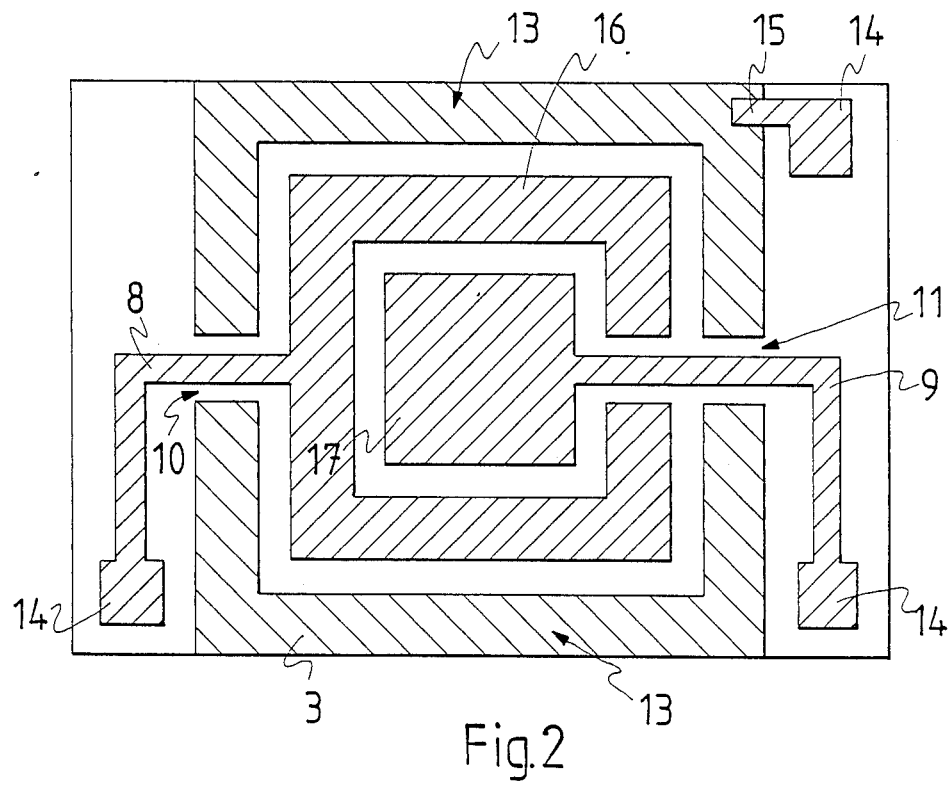
FIG. 2 is a sectional view along plane A—A in FIG. 1.

FIGS. 1 and 2 show the pressure-sensitive part of the sensor's capacitor construction. It is analogous with the construction of FIGS. 3 and 4 in prior art [1]. The capacitor proper consists of layers of different thickness of silicon and borosilicate glass with a matched thermal expansion coefficient. In FIG. 1, silicon is the material for a wafer 1. The silicon wafer 1 is bonded to a glass wafer 4 using conventional methods, for example, those described in prior art references [1] and [2]. Correspondingly, a wafer 2 is fabricated from silicon and bonded to a glass wafer 5. Between these wafer structures remains an element 3, fabricated from silicon. The silicon element 3 is advantageously fabricated to have thicker boundary rims surrounding a thinner center area 6. The silicon element 3 is bonded to the glass wafer surfaces of wafer structures 1, 4 and 2, 5 by its thicker boundary rims using, for example, an anodic bonding method described in prior art reference [3].

The silicon element 3 is processed on the side of the glass wafer 5 to have a well-shaped cavity 12, which forms the dielectric gap of the sensor capacitor. The cavity 12 communicates with an external pressure via channels 10 and 11. The other side of the thinned silicon diaphragm 6 has a second well-shaped cavity 7b, which communicates with external pressure via a hole 7 processed into the wafer structure 1 and 4. If an external pressure $P_1$ is applied via the hole 7 using a gaseous or liquid pressure medium while a pressure $P_2$ is applied via the channels 10 and 11, the silicon diaphragm 6 will deflect as determined by the pressure difference $P_2 - P_1$.

In accordance with FIG. 2, thin-film metallic areas 15, 16, and 17, together with their associated conductor areas 8 and 9 and bonding pad areas 14 are fabricated onto the surface of the glass wafer 5. The area of anodic bonding is indicated by element number 13. The area 15 forms electrical contact with the silicon element 3 and further, via an appropriate conductivity of its silicon material, to the thin silicon diaphragm 6. The areas 17 and 16 of the metallic film are appropriately placed to cover the cavity 12 and the silicon diaphragm 6 so that the area 17 is situated in the middle of the structure where the pressure-differential-induced deflection of the silicon diaphragm 6 is largest while the area 16 is correspondingly situated at the rims where the deflection of the silicon diaphragm 6 is very small. Thus, the construction contains two capacitors: one formed by the area 17 and the silicon diaphragm 6 and the other formed by the area 16 and the silicon diaphragm 6. The cavity 12 is the dielectric insulation gap for both capacitors. The capacitance of the capacitor formed by the area 17 and the silicon diaphragm 6 is denoted by Cp while the capacitance of the capacitor formed by the area 16 and the silicon diaphragm 6 is denoted by Ct, respectively.

The capacitance Cp is strongly dependent on the pressure difference as the varying pressure difference deflects the silicon diaphragm 6 causing variations in the mutual distance between the capacitor plates 6 and 17, and consequently, changes in the capacitance. The capacitance Ct is essentially less dependent on pressure because a negligible change in the mutual distance between the capacitor plates 6 and 16 is caused by pressure difference variations. The dependence of both capacitances Cp and Ct on the dielectric properties of the insulating medium in the gap 12 is essentially equal.

FIGS. 1 and 2 are simplified to illustrate the most essential details of a pressure-differential sensitive capacitor pertinent to its operation. Different modifications in the structures of its elements are feasible as illustrated, for example, in FIGS. 1 through 6 of prior art reference [4], and frequently, are even advantageous. In addition to the metallic patterns illustrated in FIGS. 1 and 2, the surface of the glass wafer 5 may have guard rings such as shown in FIG. 1B of the reference [4] or the silicon wafer 2 may be bonded to the metallized area by means of a feed-through structure penetrating the glass wafer 5 in accordance with the methods described in prior art references [2] or [4].

The dimensions of the presure-differential sensitive capacitor may vary over a wide range. The width of elements 1, 2, and 3 is typically from 2 to 20 mm, and preferably from 5 to 7 mm. The thickness of the elements 1 and 2 are typically from 0.2 to 2 mm, and preferably approximately 1 mm. The thickness of the element 3 may be from 0.1 to 0.5 mm, and preferably 0.38 mm. The thicknesses of the glass wafers 4 and 5 are typically from 0.01 to 0.2 mm, and preferably 0.05 mm. The thickness of the thinned silicon diaphragm 6 may vary in the range of from 0.005 to 0.2 mm, preferably according to the pressure range, within 0.01 to 0.1 mm, and the length of the silicon diaphragm 6 side (or correspondingly, the diameter of diaphragm circle) is from 1 to 10 mm, and preferably 2 to 4 mm. The dielectric distance across the insulation gap 12 is typically in the range of from 0.001 to 0.02 mm, and preferably 0.004 to 0.008 mm.

Figure 3:
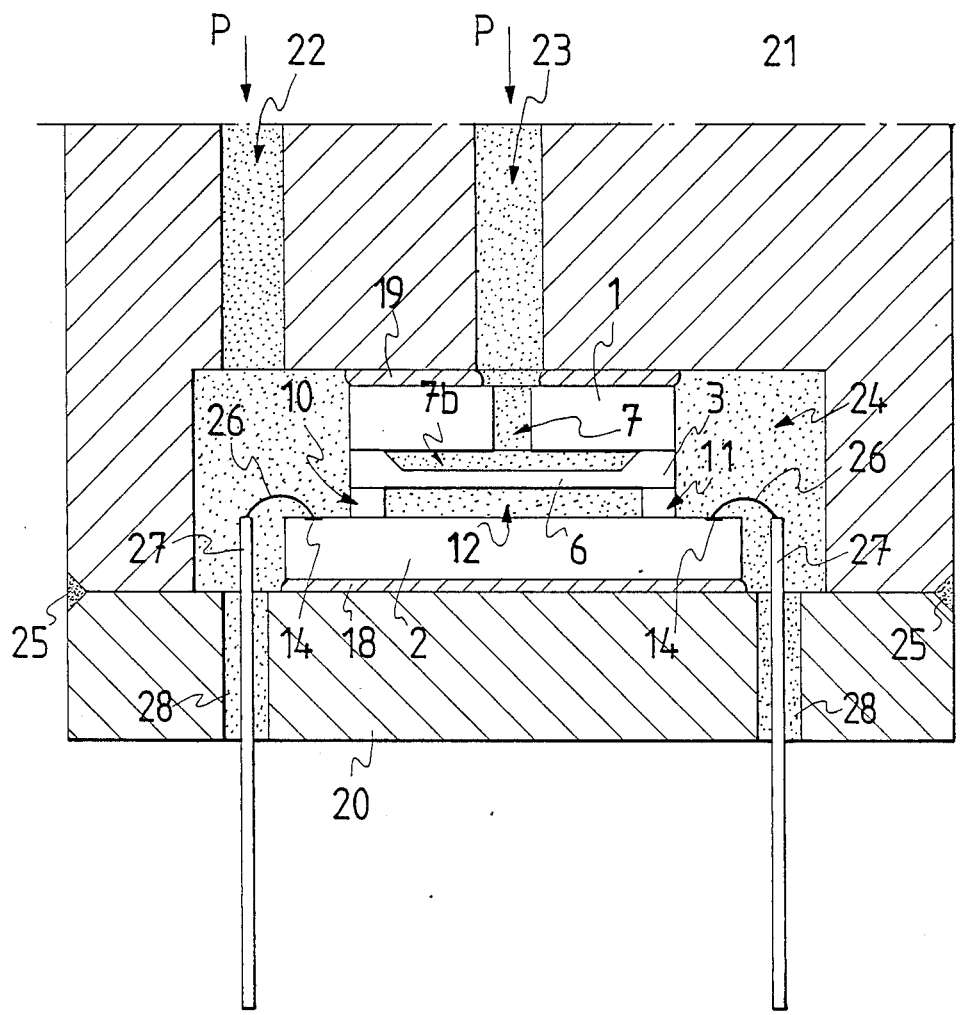
FIG. 3 is a cross-sectional side view of a capacitive pressure transducer in accordance with the invention.

The application of the capacitor according to FIGS. 1 and 2 as a pressure-sensitive element of a transducer is illustrated in FIG. 3. The capacitor is mounted by the silicon wafer 2 with an appropriately thin layer 18 of a suitable elastomer, for example silicone rubber, onto a metallic base 20. The base 20 is provided with feed-through means, in which metallic leads 27 are isolated from the base 20 by glass bushings 28. The glass bushings are melted in place to ensure the hermeticity of the feed-throughs. The bonding areas 14 of the capacitor are appropriately bonded to the corresponding leads 27 by means of thin metallic wires 26. The metallic base 20 is attached by, for example, welding around a seam 25 to another metallic case part 21, which further may be a part of a larger structure. The case part 21 has a space 24 for the capacitor. The capacitor is mounted by the silicon wafer 1 with a thin elastomer layer 19 to the metallic case part 21. Thus, the capacitor is floating between two elastomer cushions while being fixed with respect to the case members 20 and 21. The elastomer layers have a thickness of from 0.05 to 0.3 mm, and preferably 0.1 mm.

The metallic case part 21 has two boreholes 22 and 23, through which the measured pressures are applied to the capacitor. The borehole 22 communicates with space 24, while the borehole 23 is aligned with a hole 7 of the capacitor plate 1. An elastomer layer 19 isolates these two pressure channels from each other. The space 24 is filled with a liquid pressure medium, for example, silicone oil, so that the medium also fills the dielectric gap cavity 12 through the channels 10 and 11. The borehole 23 and the cavity 7B communicating with it through the hole 7 are also filled with a medium, which may be a liquid or a gas, for example, air.

The boreholes 22 and 23 may additionally communicate with the oil medium spaces, which are isolated from the measured pressure medium by a thin metallic diaphragm in the same manner as described in the prior art references [5] and [6]. If the transducer is used for gage measurement rather than for differential pressure measurement, filling of the borehole 23 with a liquid medium is unnecessary, also disposing with the need of the associated isolating diaphragm. The space 24 may be appropriately shaped according to the dimensions of the sensor capacitor to minimize the volume of the medium.

The capacitor construction described in the foregoing has two measurable capacitances, Cp and Ct. Of these, Cp is strongly dependent on the pressure differential while Ct has a weak dependence, both capacitances being dependent on the dielectric properties of the medium.

If the medium filling the cavity 12 is silicone oil, the temperature coefficient of dielectric constant is high, approximately 1000 ppm/K. This causes a high temperature dependence of the capacitances Cp and Ct which might induce temperature-dependent error in the pressure measurement in the case that capacitance Cp would alone be utilized for the measurement of pressure difference. Since a second capacitance Ct with a different pressure relationship than that of Cp is also available having a strong temperature dependence, mathematical functions can be formulated to find values from the capacitances for both the pressure difference and temperature with a sufficient accuracy.

$$P_2 - P_1 = p(C_p, C_t)$$

$$t = t(C_t, C_p)$$

The functions p and t may be formulated, for example, in polynomial form. The coefficients of polynoms can be determined by measuring the two capacitances, Cp and Ct, at a sufficient number of values for pressure difference and temperature.

What is claimed is:

1. A capacitive pressure transducer, comprising:
a capacitive sensor structure;
a case into which the capacitive sensor structure is mounted;

channels formed in the case for introducing a measured medium into the capacitive sensor structure;

electric conductors through which the capacitive pressure information available from the capacitive sensor structure is made externally available; and thin resilient structure means formed within the case for fixing the capacitive sensor structure in the case so that the capacitive sensor structure is floating between said thin resilient structure means, wherein said thin resilient structure means are of a substantially rectangular shape and wherein the width of each is more than six times its height.

2. A capacitive pressure transducer in accordance with claim 1, wherein the layer thickness of each of said thin resilient structures is from 0.05 to 0.3 mm, and preferably 0.1 mm.

3. A capacitive pressure transducer in accordance with claim 2 wherein the capacitive sensor structure includes a supporting plate consisting of a silicon wafer and a glass wafer attached onto said silicon wafer with an electrostatic bonding method, said glass wafer being essentially thinner than the silicon wafer, a first fixed capacitor plate disposed on the substrate plate, a silicon plate disposed on the substrate plate and encircling the fixed capacitor with its center part processed into a diaphragm structure acting as a moving capacitor plate, a top plate disposed on the silicon plate with a combination structure consisting of a silicon wafer and of a glass wafer attached onto said silicon wafer and placed against the silicon plate, said glass wafer being essentially thinner than the silicon wafer, and a second capacitor plate disposed on the supporting substrate plate between the first capacitor plate and the silicon plate, wherein the capacitive sensor structure is attached at its lower and upper silicon wafers with said pair of thin resilient structures to the case.

4. A capacitive pressure transducer;

a capacitive sensor structure;

a case for mounting the capacitive sensor structure;

channels formed in said case for introducing a measured medium into said capacitive sensor structure;

electric conductors through which capacitive pressure information available from said capacitive sensor structure is made externally available; and thin resilient structure means formed within said case for fixing said capacitive sensor structure between said thin resilient structure means, said thin resilient structure means including a pair of horizontally opposed elastomeric cushions;

said capacitive sensor structure including a supporting plate consisting of a silicon wafer and a glass wafer attached onto said silicon wafer by elastomeric bonding, said glass wafer being essentially thinner than the silicon wafer, a first fixed capacitor plate disposed on the substrate plate, a silicon plate disposed on the substrate plate and encircling the fixed capacitor with its center part processed into a diaphragm structure acting as a moving capacitor plate, a top plate disposed on the silicon plate with a combination structure consisting of a silicon wafer and a glass wafer attached to the silicon wafer and placed against the silicon plate, said glass wafer being essentially thinner than the silicon wafer, and a second capacitor plate disposed on the supporting substrate plate between the first capacitor plate and the silicon plate, wherein the first capacitor plate is essentially enclosed and the capacitive sensor structure is attached at its lower and upper silicon wafers to said case with said pair of elastomeric cushions.

5. A capacitive pressure transducer according to claim 4, wherein the layer thickness of each said elastomeric cushion is between 0.05 and 0.3 mm thick.

* * * * *